(12) United States Patent
Takasu (10) Patent No.: US 7,124,868 B2
(45) Date of Patent: Oct. 24, 2006

(54) ONE-WAY CLUTCH DEVICE AND METHOD FOR MANUFACTURING THE SAME

(75) Inventor: Yasuhide Takasu, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/778,073

(22) Filed: Feb. 17, 2004

(65) Prior Publication Data

US 2005/0034951 A1    Feb. 17, 2005

(30) Foreign Application Priority Data

Feb. 18, 2003   (JP)   ............... 2003-039933
Jun. 18, 2003   (JP)   ............... 2003-173720

(51) Int. Cl.
    *F16D 41/06*   (2006.01)
(52) U.S. Cl. ...................................... 192/45
(58) Field of Classification Search ............... 384/523, 384/572, 575, 580; 29/898.067, 898.065
    See application file for complete search history.

(56) References Cited

U.S. PATENT DOCUMENTS

| 1,006,688 | A | * | 10/1911 | Schneider | ............... 384/523 |
|---|---|---|---|---|---|
| 1,100,179 | A | * | 6/1914 | Foster | .................. 384/580 |
| 1,426,038 | A | * | 8/1922 | Burkholder | ............. 384/572 |
| 2,677,448 | A | * | 5/1954 | Gillespie | ........... 29/898.065 |
| 2,677,449 | A | * | 5/1954 | Wavak | ............. 29/898.067 |
| 4,422,537 | A | * | 12/1983 | Ritter et al. | ............... 192/45 |
| 4,787,490 | A | * | 11/1988 | Lederman et al. | .......... 192/45 |
| 4,815,577 | A | * | 3/1989 | Lederman | ................. 192/45 |
| 5,042,628 | A | * | 8/1991 | Malecha | ................... 192/45 |
| 5,782,329 | A | * | 7/1998 | Muramatsu et al. | ...... 192/45.1 |

FOREIGN PATENT DOCUMENTS

| JP | 49-20603 Y | 6/1974 |
|---|---|---|
| JP | 56-41847 B2 | 9/1981 |
| JP | 2574315 Y2 | 3/1998 |
| JP | 11-117955 A | 4/1999 |

* cited by examiner

*Primary Examiner*—Rodney H. Bonck
(74) *Attorney, Agent, or Firm*—Miles & Stockbridge PC (57) ABSTRACT

A one-way clutch device comprises a plurality of torque transmission members interposed between an inner race element and an outer race element for performing torque transmission therebetween only during one-way relative rotation. A cage has a pair of flanges for holding the torque transmission members therebetween and a plurality of coupling columns for coupling the paired flanges together. The coupling columns of the cage are fixed to fixing portions provided on an inner peripheral side and an outer peripheral side of the flanges.

7 Claims, 13 Drawing Sheets

ONE-WAY CLUTCH DEVICE AND METHOD FOR MANUFACTURING THE SAME

This application claims the benefit of Japanese Patent applications No. 2003-039933 and No. 2003-173720 which are hereby incorporated by reference.

BACKGROUND OF THE INVENTION

1. Field of the Invention

The present invention relates to a one-way clutch device which is assembled in a starter apparatus, or the like, for an automatic two-wheeled vehicle, and a method for manufacturing the same.

2. Related Background Art

A starter apparatus for an automobile is additionally provided with a one-way clutch device for performing torque transmission from an electric motor side to an internal combustion engine side only, in order to prevent overrun of the electric motor after the internal combustion engine is started. As a one-way clutch device of this type, one type is dominantly used in which clutch elements such as torque transmission rollers, cam surfaces and a spring is interposed between an inner race element and an outer race element, and these clutch elements are accommodated in and retained by a cage which is formed of a steel plate or synthetic resin (see the Japanese Utility Model Registration No. 2574315 (page 3, FIG. 1), the Japanese Patent Publication No. 56-41847 (page 3, FIG. 1), the Japanese Utility Model Publication No. 49-20603 (page 2, FIG. 6) and the Japanese Patent Application Laid-Open No. 11-117955 (page 1, FIG. 2, particularly), for example).

Also, there is disclosed in the Japanese Patent Application Laid-Open No. 11-117955 a one-way clutch device in which a cage formed of an elastically deformable material comprises a cylindrical portion and a flange, the flange has a plurality of clapper pieces which are elastically deformable and extended substantially in a circumferential direction, and the clapper pieces are inserted in flange receiving grooves formed on the outer race by the use of the elastic deformation of the clapper pieces to be fixed in the axial direction. That is, the flange is provided with a small-diameter portion and the clapper pieces which are extended substantially in the circumferential direction to be elastically deformable formed on the same flat surface thereof. On the outer race, there are formed flange receiving grooves each having the diameter larger than that of the small-diameter portion of the flange and smaller than that of the clapper piece. When each of the clapper pieces is flexed to be moved to the position of the flange receiving groove, the elastically deformable clapper piece is, with the property of returning into its original form, fitted into the flange receiving groove, whereby the one-way clutch is retained at that position in the axial direction.

The conventional one-way clutch device described above functions well without any trouble in a starter apparatus for a four-wheeled vehicle in which the maximum number of rotations of the internal combustion engine is comparatively low which is, e.g., approximately 6,000rpm. However, when this clutch device is used in a starter apparatus for an automatic two-wheeled vehicle in which the maximum number of rotations of the internal combustion engine is comparatively high which is, e.g., approximately 15,000 rpm, such a problem as described below may be brought about. That is, for example, during the operation of the internal combustion engine, a constituent member of the one-way clutch device is affected by the centrifugal force which follows the rotation. In the case of an automatic two-wheeled vehicle, the centrifugal force becomes very large due to the high maximum number of rotations, so that coupling columns of the cage are sometimes deformed to spread in the outer diameter direction. Moreover, since the centrifugal force acting on the spring becomes larger in the same manner, the spring may come off the cage such that its function of urging the torque transmission rollers can not be performed.

There is another fear that the cage and a member and the like assembled in the cage may fall out from the outer race member (outer race element) at the time of conveyance prior to the installation thereof to the main body of the two-wheeled vehicle, an automatic transmission, etc., In the one-way clutch disclosed in the Japanese Patent Application Laid-Open No. 11-117955, the elastically deformable clapper pieces are fitted into the flange receiving groove, with the property of returning into its original form, so that the one-way clutch is retained at that position in the axial direction. For this reason, it is possible to prevent fall out of parts such as a cage. However, the structure disclosed in the Japanese Patent Application Laid-Open No. 11-117955 mainly depends on the elastic deformation of the clapper pieces, which is not always advantageous to prevention of a fall out of the cage or the like parts.

Further, when the constituent parts of the cage are assembled to complete the cage, the assembling performance of each part is not always satisfactory. For example, when the detention piece is to be fitted in the recess, the detention may be hooked by the recess.

SUMMARY OF THE INVENTION

The present invention has been contrived taking the situation described above into consideration, and an object of the invention is to provide a one-way clutch device with the intention of improving the strength of the coupling columns, preventing a fall out of a spring, or the like, and further with the intention of preventing a fall out of the cage, or the like, from the outer race in order to improve the assembling performance of each constituent part of the cage, and a method for manufacturing such a one-way clutch device.

In order to solve the above-described problems, according to a first aspect of the present invention, there is provided a one-way clutch device comprising a plurality of torque transmission members interposed between an inner race element and an outer race element for performing torque transmission between the inner race element and the outer race element only during one-way relative rotation, and a cage having a pair of flanges for holding these torque transmission members therebetween and a plurality of coupling columns for coupling the paired flanges together, wherein the coupling columns of the cage may be fixed to fixing portions provided at least at two positions on the inner peripheral side and the outer peripheral side of the flanges.

In a first mode of the present invention, in the one-way clutch device according to the first aspect, at least one of the fixing portions may be a hole or a recess, and a caulking portion to be fitted in the hole or recess to be caulked may be formed in an end portion of the coupling column.

In a second mode of the present invention, in the one-way clutch device of the first mode, at least one of the fixing portions may be a hole or a recess, and a detention portion to be fitted in the hole or recess may be formed in an end portion of the coupling column.

In a third mode of the present invention, in the one-way clutch device of the second mode, a guide part may be formed on the detention portion for guiding the detention portion to be fitted into the recess or hole.

In a fourth mode of the present invention, in the one-way clutch device of the third mode, the guide part may be formed by chamfering or beveling the tip end of the detention portion.

In a fifth mode of the present invention, in the one-way clutch device according to either one of the second to fourth modes, the tip end of the detention portion may be protruded from the flange.

In a sixth mode of the present invention, in the one-way clutch device of the fifth mode, an amount of projection of the detention portion may be smaller than that of the caulking portion.

In a seventh mode of the present invention, the one-way clutch device described above may further comprise springs for urging respectively the torque transmission members in the direction of torque transmission, wherein a fixed end of each spring may be held between the flange and the coupling column between the two fixing portions.

In an eighth mode of present invention, in the one-way clutch device described above, each coupling column may be extended from one of the flanges and may be fixed to the other of the flanges.

According to a second aspect of the present invention, in one-way clutch device comprising an inner race element, an outer race element disposed to be coaxial and relatively rotatable with this inner race element, a plurality of cam surfaces formed on either one of the outer peripheral surface of the inner race element and the inner peripheral surface of the outer race element, a cylindrical surface formed on the other of the outer peripheral surface of the inner race element and the inner peripheral surface of the outer race element, a plurality of torque transmission rollers interposed between the cam surfaces and the cylindrical surface, springs for urging the respective torque transmission rollers in the direction of torque transmission, and a cage for retaining the torque transmission rollers and the springs, the cage being constituted by two metal plates each in a substantially annular form, a plurality of coupling columns bent up substantially perpendicularly from one of the metal plates being fixed to the other of the metal plates, and the torque transmission rollers and the springs being retained between the adjacent coupling columns, the coupling column may have an outer peripheral portion substantially along the tangential direction of the outer race element, an inner peripheral portion substantially along the tangential direction of the inner race element, and an inclined portion for coupling the outer peripheral portion and the inner peripheral portion together; a connection piece protruded from an end surface of the outer peripheral portion may be fixed to the other of the metal plates; and a detention piece protruded from an end surface of the inner peripheral portion may be fitted in a recess formed on the other of the metal plates.

In a ninth mode of the present invention, in the one-way clutch device according to the second aspect, the fixing may be fitting of the connection piece in the hole or recess formed on the other of the metal plates to be caulked.

In a tenth mode of the present invention, in the one-way clutch device according to the second aspect, the fixed end of the spring may be held by and between said inclined portion and the other of said metal plates.

In an eleventh mode of the present invention, in the one-way clutch device according to the second aspect comprising outer and inner races which are arranged coaxially and a cage provided with torque transmission members and biasing springs for urging the respective torque transmission members between the outer and inner races, the cage may have a flange which is provided with an engagement projection; and a fit groove into which the engagement projection may be fitted is formed on at least one of the outer and inner races.

In a twelfth mode of the present invention, in the one-way clutch device of the eleventh mode, a plurality of the engagement projections may be provided on the circumference at regular intervals.

In a thirteenth mode of the present invention, in the one-way clutch device of the tenth to eleventh modes, the fit grooves may be formed in a substantially annular form.

In a fourteenth mode of the present invention, in the one-way clutch device according to either one of the tenth to thirteenth mode, the engagement projections may be formed on the outer periphery of the flange and the fit grooves may be formed on the inner periphery of the outer race.

In a fifteenth mode of the present invention, in the one-way clutch device according to either one of the tenth to fourteenth mode, the inner element or the outer element may be provided with a guide part for guiding the engagement projections to be fitted in the fit grooves when the cage is assembled.

According to a third aspect of the present invention, there is provided a method for manufacturing a one-way clutch device comprising an inner race element, an outer race element disposed to be coaxial and relatively rotatable with the inner race element, a plurality of cam surfaces formed on either one of the outer peripheral surface of the inner race element and the inner peripheral surface of the outer race element, a cylindrical surface formed on the other of the outer peripheral surface of the inner race element and the inner peripheral surface of the outer race element, a plurality of torque transmission rollers interposed between the cam surfaces and the cylindrical surface, springs for urging the torque transmission rollers in the direction of torque transmission, and a cage for retaining the torque transmission rollers and the springs, the cage being constituted by two metal plates each in a substantially annular form, a plurality of coupling columns bent up substantially perpendicularly from one of the metal plates being fixed to the other of the metal plates, and the torque transmission rollers and the springs being retained between the adjacent coupling columns, which manufacturing method comprising: a step of blanking a first work serving as one of the metal plates from a metal plate material; a step of bending coupling column portions of the first work to have a predetermined cross section; a step of obtaining a first metal plate by bending up the coupling column portions of the first work; a step of blanking the other of the metal plates from a metal plate material together with a fixing hole or recess; a step of attaching an end of each spring to the corresponding coupling column of the first metal plate; and a step of fixing the coupling columns of the first metal plate to the second metal plate.

In the method for manufacturing a one-way clutch device according to the present invention, the step of fixing the coupling columns of the first metal plate to the second metal plate may be carried out by fitting and caulking a connection piece formed to be protruded on an end portion of each coupling column into the hole or recess.

In the method for manufacturing a one-way clutch device according to the present invention, the step of fixing the coupling columns of the first metal plate to the second metal plate may be carried out by fitting and fastening a detention piece formed to be protruded at an end portion of each coupling column in the hole or recess.

DESCRIPTION OF THE PREFERRED EMBODIMENTS

The present invention will be specifically described below with reference to the drawings.

(First Embodiment)

Figure 1:
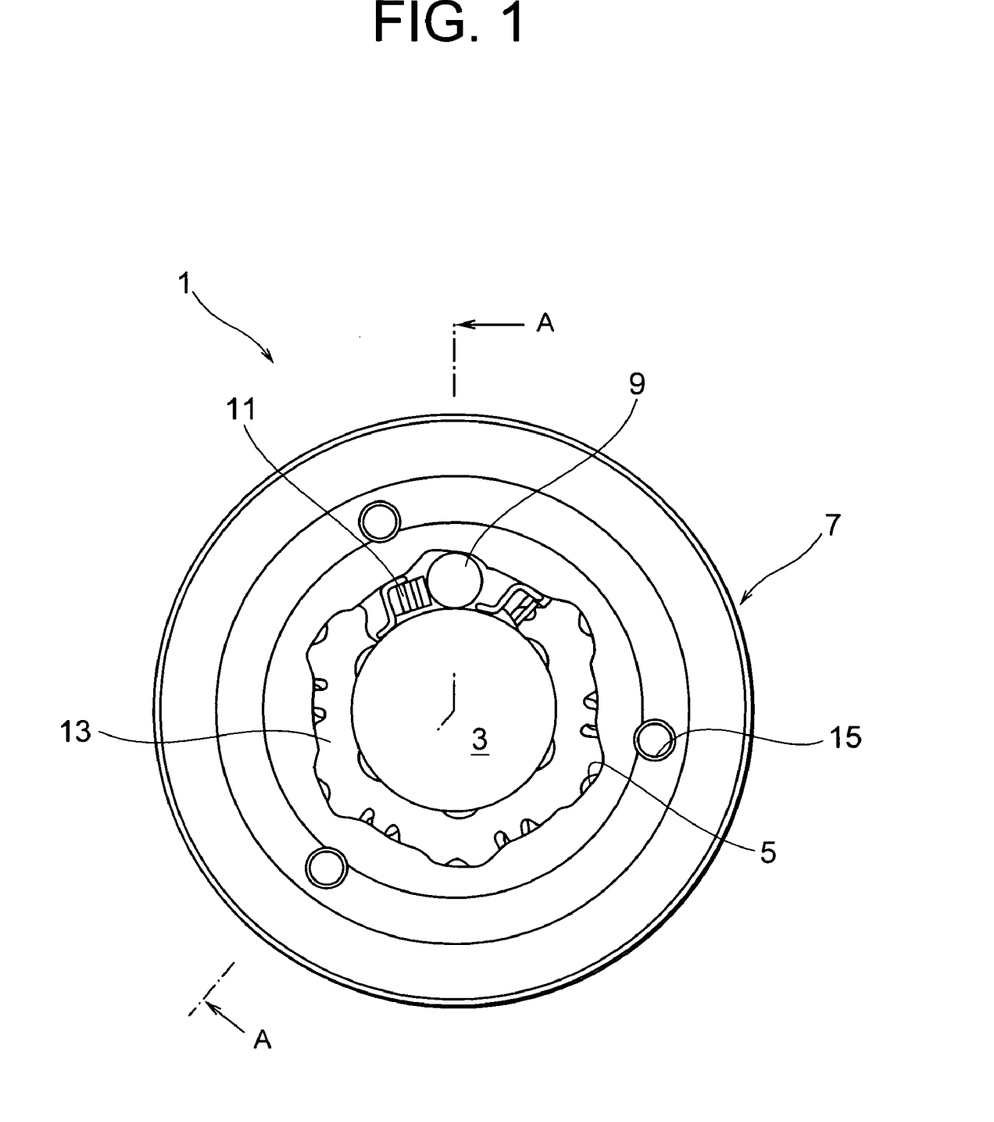
FIG. 1 is a front view of a one-way clutch device according to an embodiment of the present invention.
Figure 2:
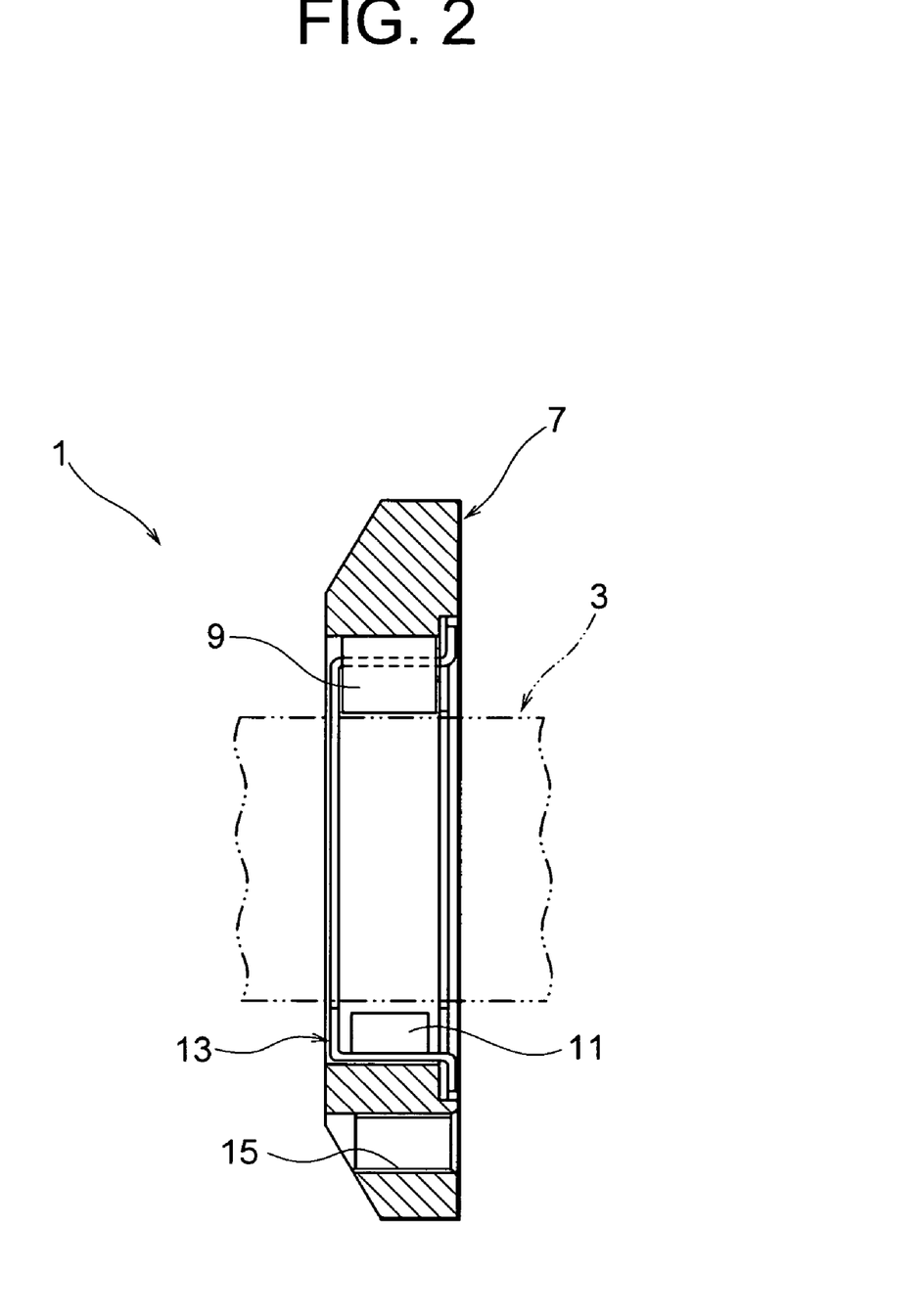
FIG. 2 is a cross-sectional view taken along line A—A in FIG. 1.

FIG. 1 is a front view for showing a first embodiment of a one-way clutch device according to the present invention, and FIG. 2 is a cross-sectional view taken along line A-A in FIG. 1. Also, FIG. 3 is a front view of a cage, and FIG. 4 is an enlarged view of an essential portion of the cage.

As shown in FIG. 1 and FIG. 2, the one-way clutch device 1 of the present invention is comprised of an inner race member (inner race element) 3, an outer race member (outer race element) 7 which is disposed coaxially with and relatively rotatable with respect to the inner race member 3 and is provided with a plurality of cam surfaces 5 (six in the present embodiment) formed on the inner periphery thereof, a plurality of torque transmission rollers 9 (six in the present embodiment) which are interposed between the inner race member 3 and the outer race member 7, accordion springs 11 for urging respectively the torque transmission rollers 9 in the direction of torque transmission, and a cage 13 formed of a steel plate.

In the case of the present embodiment, the inner race member 3 is coupled to a start motor which is not shown in the drawing while the outer race member 7 is coupled to a generator which is not shown in the drawing. A tapped hole 15 is formed on the outer race member 7 and is to be used to fasten the outer race member 7 to the generator.

Figure 3:
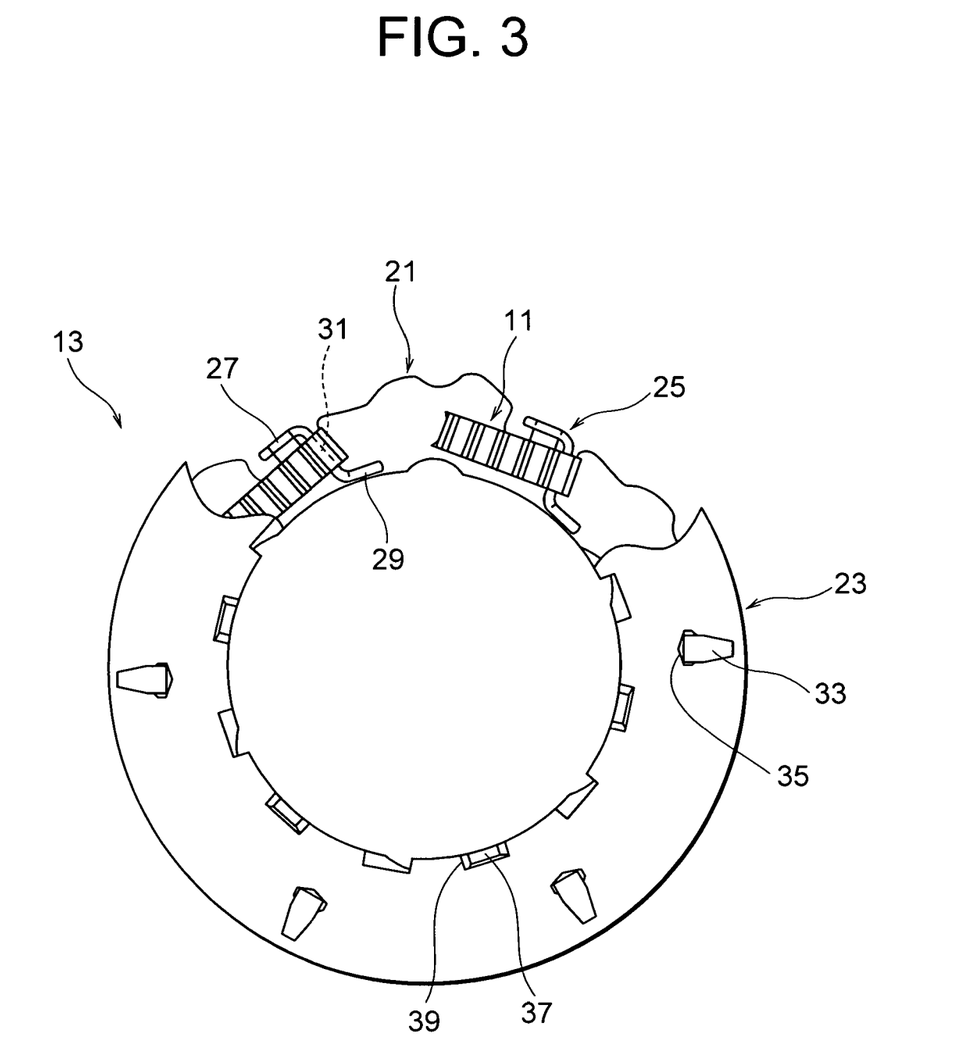
FIG. 3 is a front view of a cage according to the first embodiment of the present invention.
Figure 4:
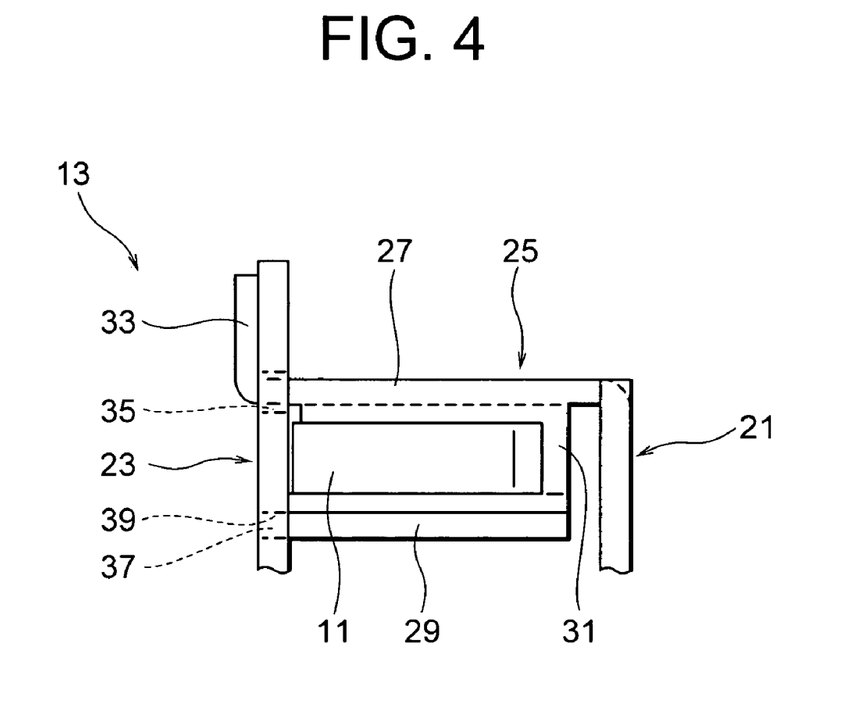
FIG. 4 is an enlarged view of an essential portion of the cage according to the first embodiment of the present invention.

As shown in FIG. 3 and FIG. 4, the cage 13 is comprised of a first flange (one of metal plates) 21 and a second flange (the other of the metal plates) 23 assembled therein. The both flanges are formed of steel plates by pressing. The accordion springs 11 are retained by the respective coupling columns 25 extended from the first flange 21 and by the second flange 23.

Each coupling column 25 comprises an outer peripheral portion 27 extended substantially along the tangential direction of the outer race member 7, an inner peripheral portion 29 substantially along the tangential direction of the inner race member 3, and an inclined portion 31 for coupling the outer peripheral portion 27 and the inner peripheral portion 29 together. Then, connection pieces 33 protruded from an axial end surface of the outer peripheral portion 27 are fitted in the respective through holes 35 formed on the second flange 23 and caulked thereon, and detention pieces 37 protruded from an axial end surface of the inner peripheral portion 29 are fitted in the respective recesses 39 formed on the second flange 23 to be detained.

Figure 5:
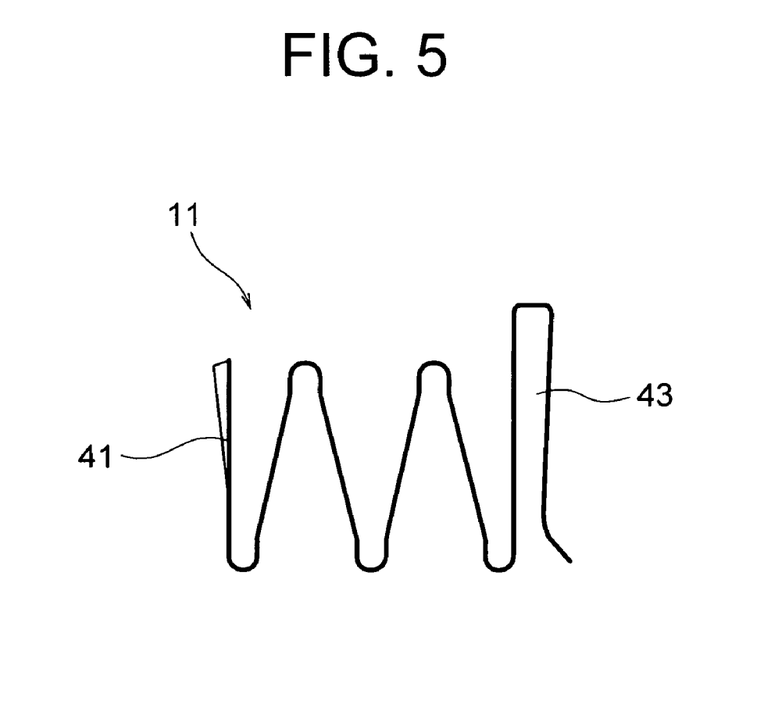
FIG. 5 is a plan view of an accordion spring.

As shown in FIG. 5, each accordion spring 11 comprises a pressing portion 41 for urging the corresponding torque transmission roller 9 and a fixed end 43 which is retained by the corresponding coupling column 25. The fixed end 43 of each accordion spring 11 is held by and between the inclined portion 31 and the second flange 23, so as to prevent the accordion spring 11 from falling out in the radial direction by the connection pieces 33 and the detention pieces 37.

Description will be made below on a method for manufacturing the one-way clutch device of the present embodiment.

Figure 6:
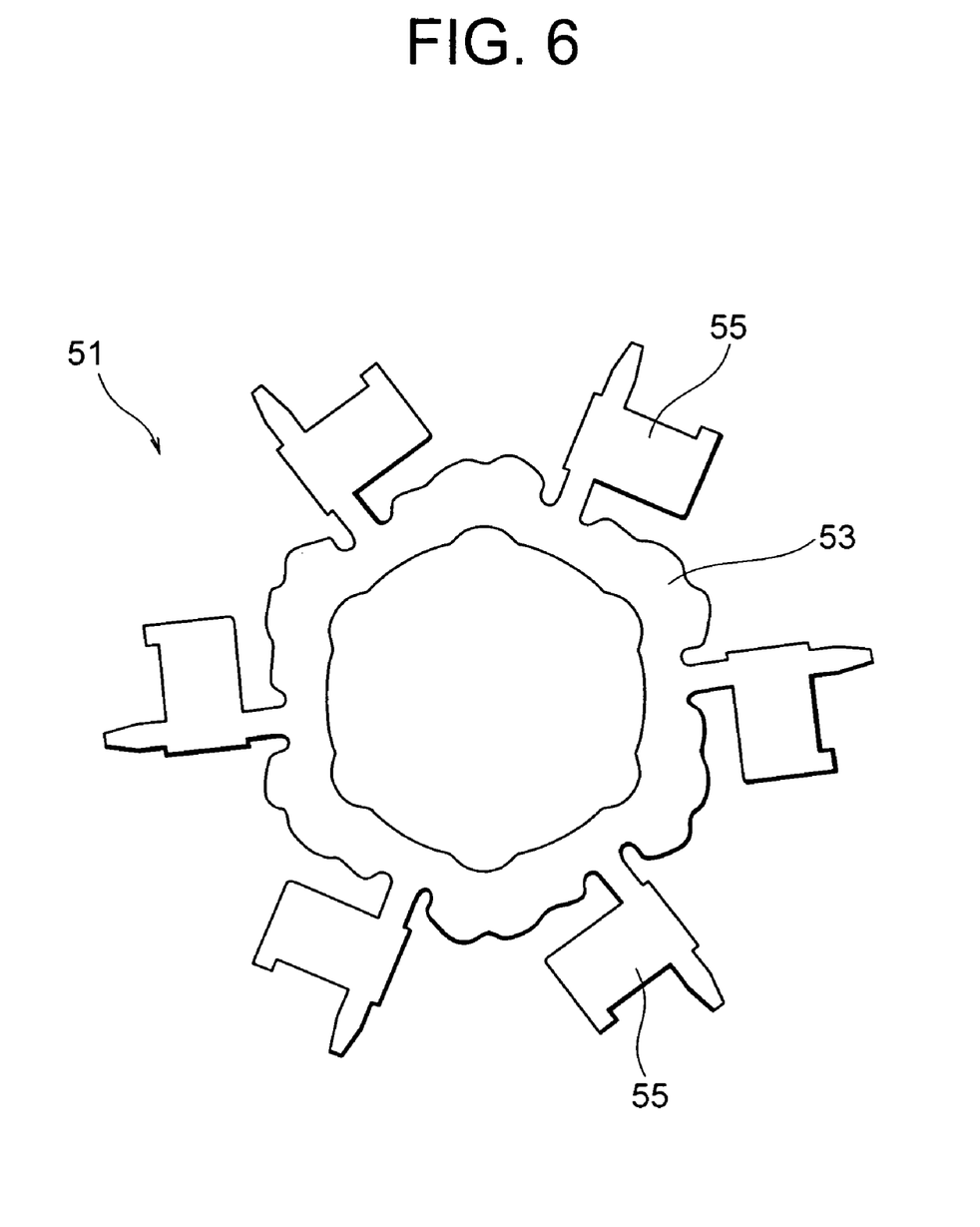
FIG. 6 is a front view of a work.

A manufacturer blanks a work 51 shown in FIG. 6 from a steel plate material by the use of a pressing machine. The work 51 is constituted by six coupling column portions 55 which serve as coupling columns 25 formed on the outer peripheral side of a flange portion 53 serving as the first flange portion 21.

Figure 7:
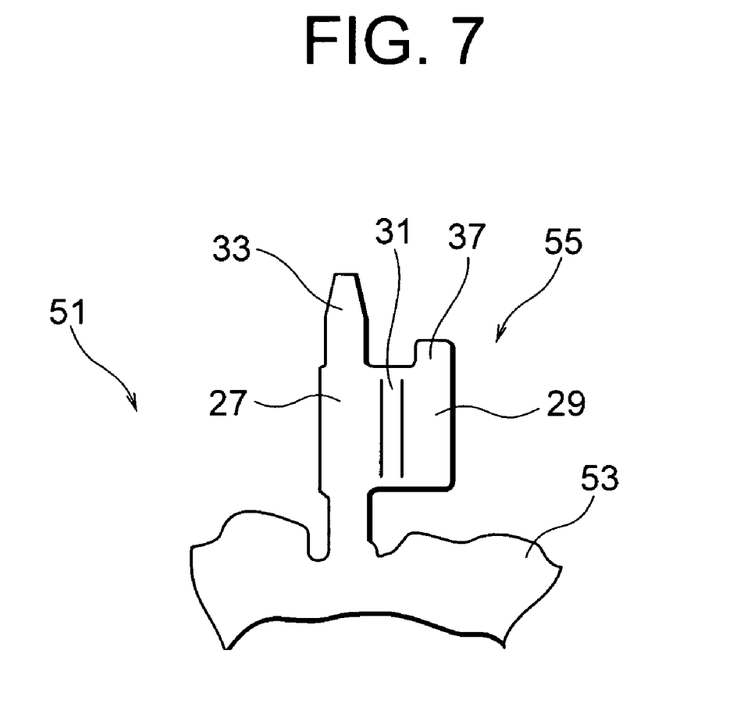
FIG. 7 is an explanatory view for illuminating a treatment process of the work.
Figure 8:
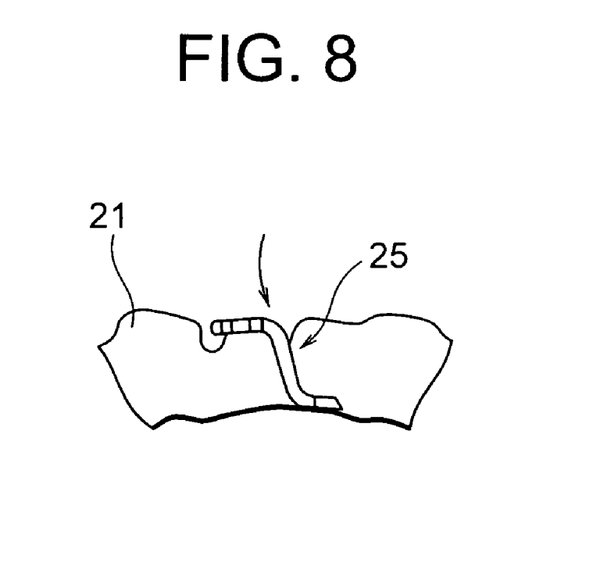
FIG. 8 is an explanatory view for illuminating the treatment process of the work.

Upon completion of the blanking of the work 51, the manufacturer executes a bending process on the coupling column portions 55 by the use of the pressing machine, as shown in FIG. 7, thereby forming the inclined portions 31, each coupling the outer peripheral portion 27 and the inner peripheral portion 29 together. The connection piece 33 is formed to be protruded from an end of the outer peripheral portion 27, and the detention piece 37 is protruded from an end of the inner peripheral portion 29. The manufacturer then bends up the coupling column portions 55 by the pressing machine, thereby completing the first flange 21 having the coupling columns 25 perpendicularly thereto.

Figure 9:
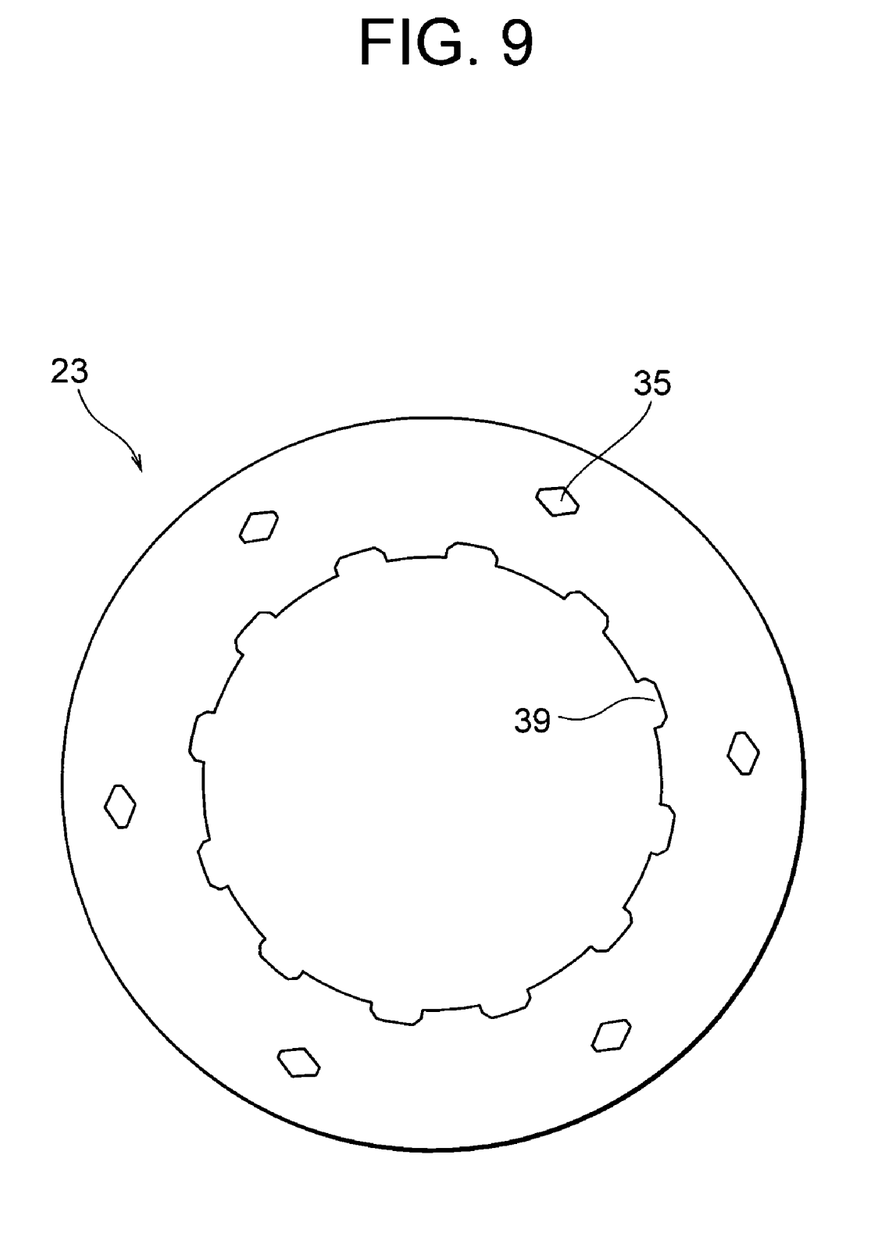
FIG. 9 is a front view of a second flange.

Additionally, the manufacturer blanks the second flange 23 shown in FIG. 9 from the steel plate material by the use of a pressing machine. The second flange 23 is formed with six through holes 35 and twelve recesses 39 on the inner peripheral end thereof.

Figure 10:
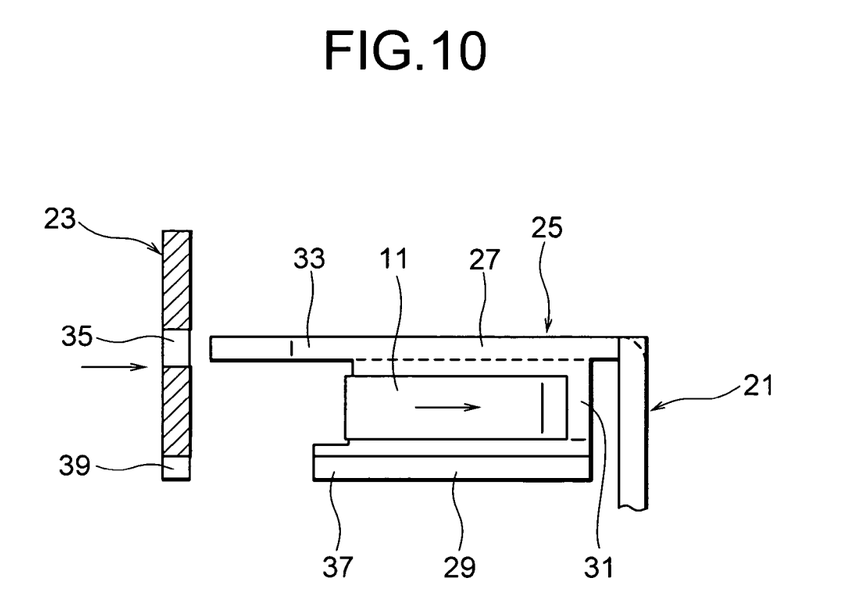
FIG. 10 is an explanatory view for illuminating an assembling process of the cage.
Figure 11:
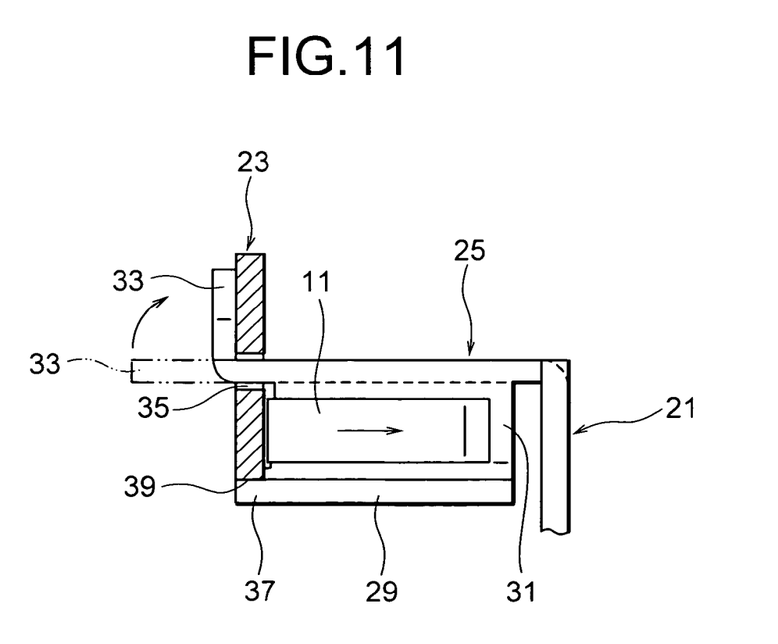
FIG. 11 is an explanatory view for illuminating an assembling process of the cage.

Upon completion of the first flange 21 and the second flange 23, the manufacturer fits the connection pieces 33 of the coupling columns 25 into the respective through holes 35 of the second flange 23 and the detection pieces 37 into the respective recesses 39 in a state that the fixed end 43 of each accordion spring 11 has been inserted on the corresponding inclined portion 31 of the coupling column 25, as shown in FIG. 10. After that, as shown in FIG. 11, the manufacturer caulks the connection pieces 33 protruded through the respective through holes 35 to thereby complete the cage 13. In the present embodiment, since there are arranged twelve recesses 39, the directionality (either the surface or the back) of the second flange 23 disappears so as to make the assembling work easier.

Upon completion of the cage 13, the manufacturer assembles the torque transmission rollers 9 in the cage 13 and then installs the cage 13 between the inner race member 3 and the outer race member 7, thereby completing the manufacturing process.

Each of the coupling columns 25 of the cage 13 in the present embodiment has a substantially Z-shaped cross section consisting of the outer peripheral portion 27, the inner peripheral portion 29 and the inclined portion 31, so that the strength and the rigidity thereof become very high. For this reason, there is no fear that the coupling column 25 may be deformed by the centrifugal force even when the one-way clutch device is used for an automatic two-wheeled vehicle. Also, since the fixed end 43 of each accordion spring 11 is held or sandwiched by and between the inclined portion 31 and the second flange 23 and further the accordion spring 11 is prevented from falling out in the radial direction by the connection piece 33 and the detention piece 37, there is no fear at all that the accordion spring 11 may fall out as a result of centrifugal force.

(Second Embodiment)

Figure 12:
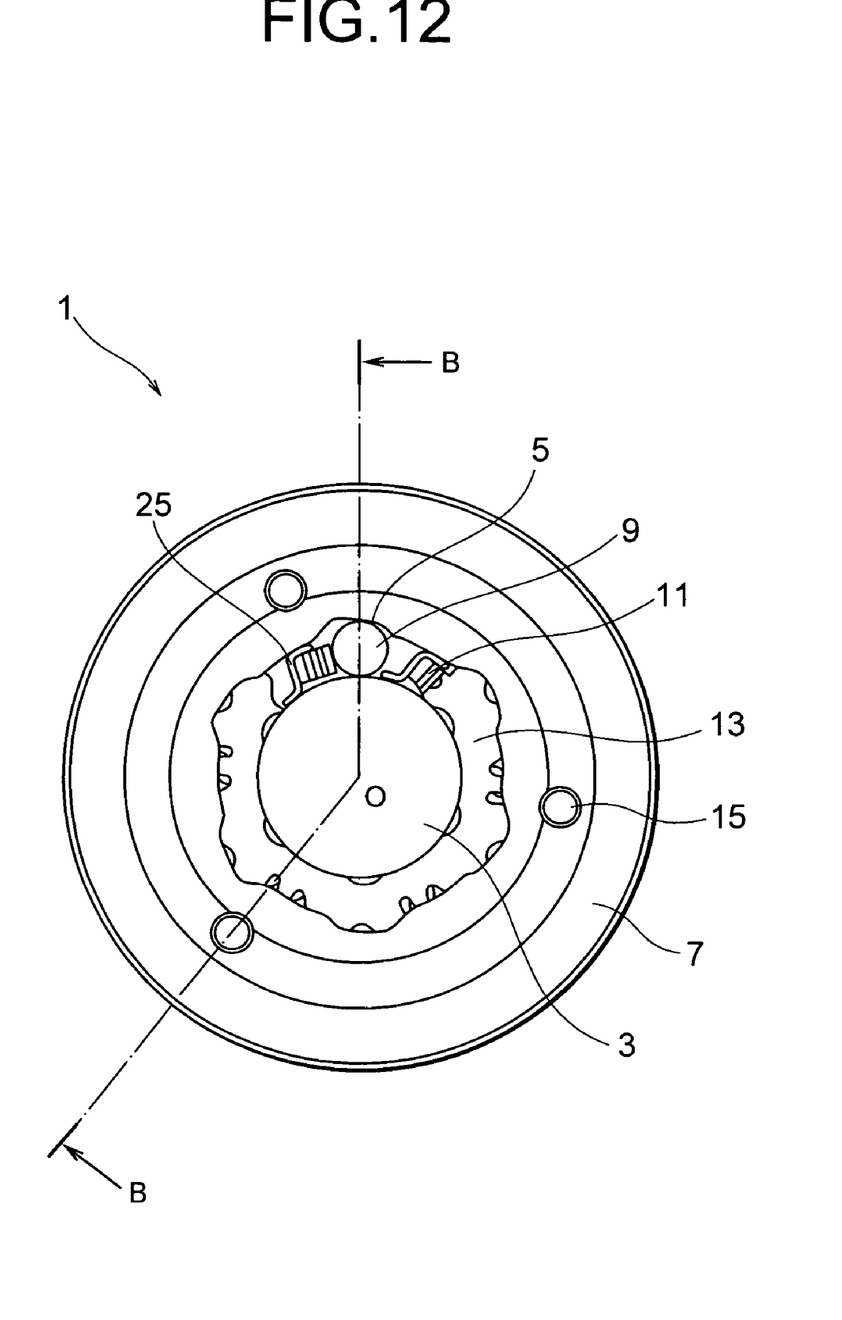
FIG. 12 is a front view of a one-way clutch device according to a second embodiment of the present invention.
Figure 13:
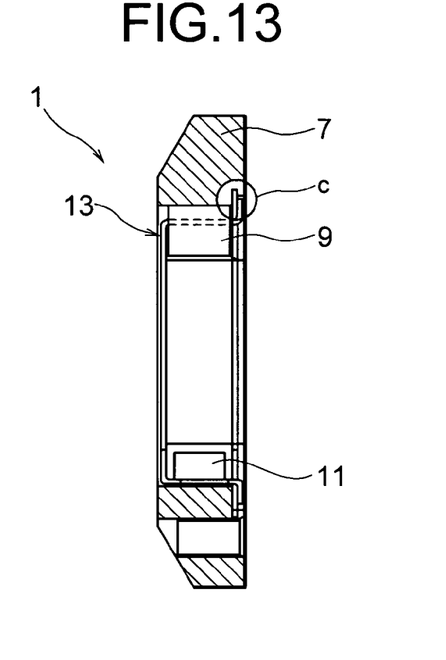
FIG. 13 is a cross-sectional view taken along line B—B in FIG. 12.
Figure 14:
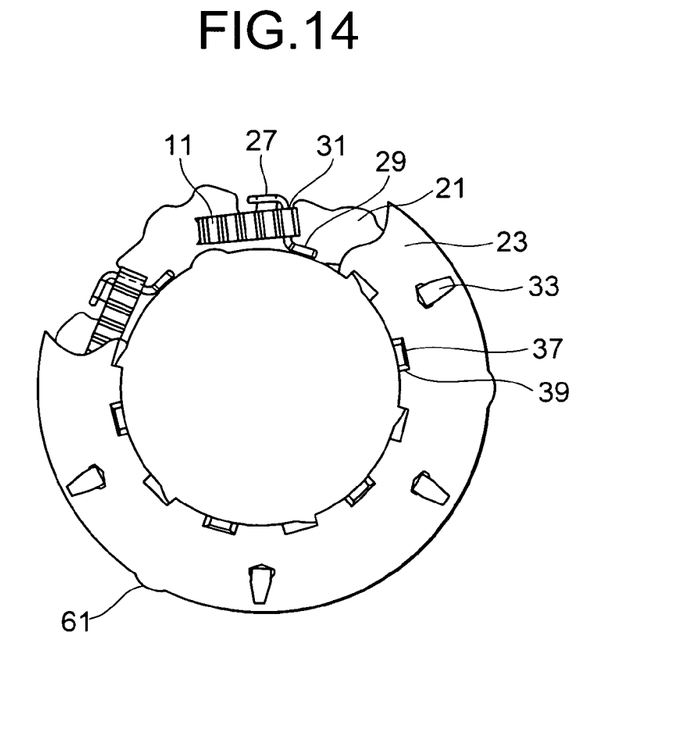
FIG. 14 is a partially exploded front view of the cage shown in FIG. 12.
Figure 15:
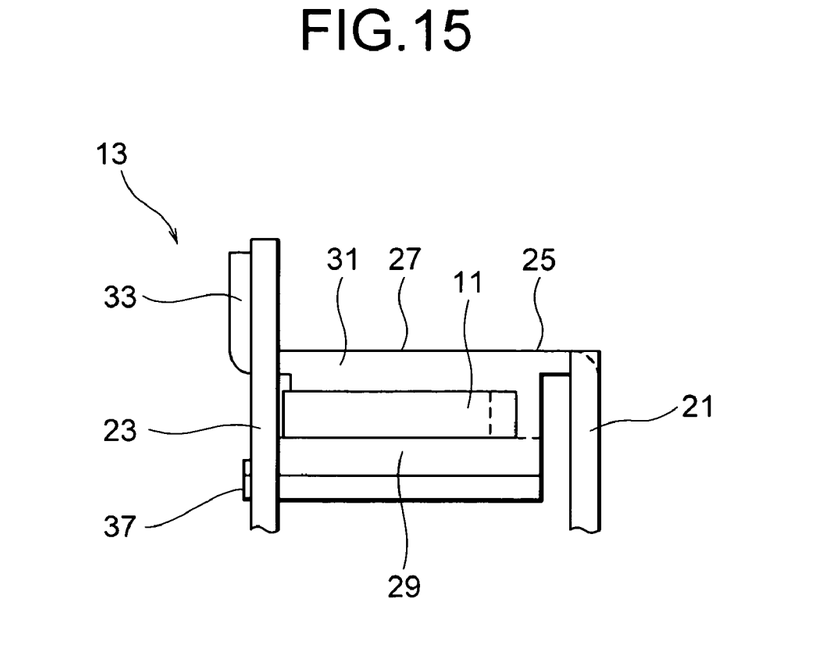
FIG. 15 is an enlarged view for showing an essential portion of the cage shown in FIG. 12.

FIG. 12 is a front view of a one-way clutch device according to a second embodiment of the present invention, FIG. 13 is a cross-sectional view taken along line B—B in FIG. 12, and FIG. 14 is a partially exploded front view of the cage shown in FIG. 12. FIG. 15 is an enlarged view for showing an essential portion of the cage shown in FIG. 12.

Figure 16:
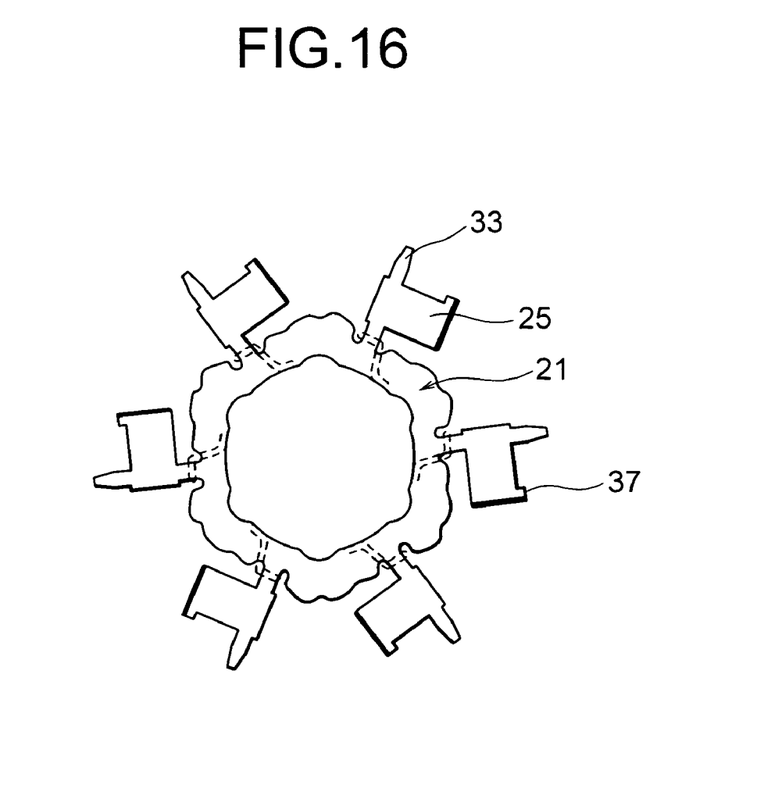
FIG. 16 is a developed view of the cage on the first flange side.
Figure 17:
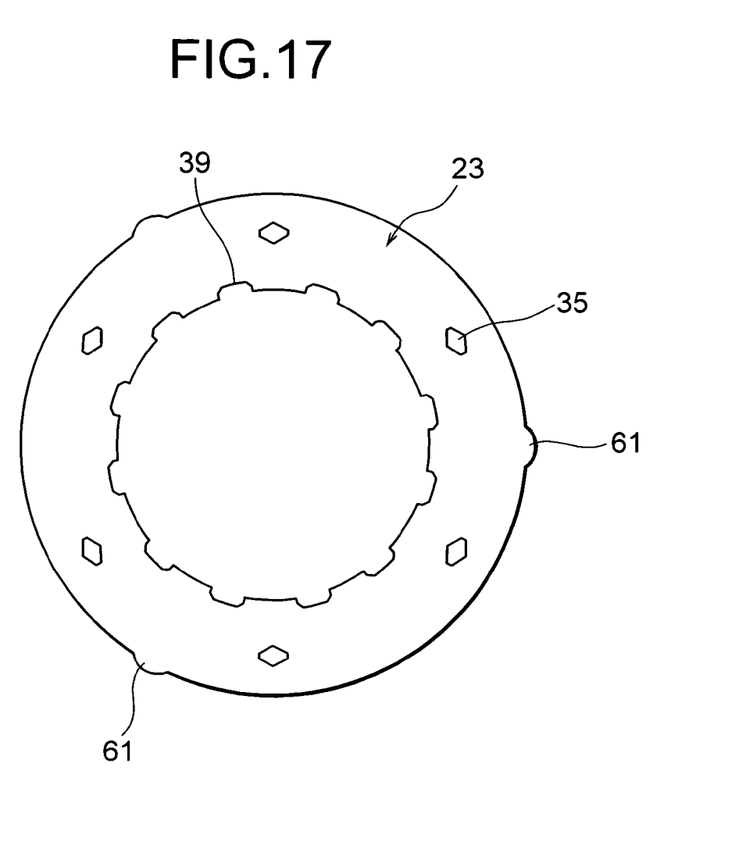
FIG. 17 is a front view of the cage on the second flange side.
Figure 18:
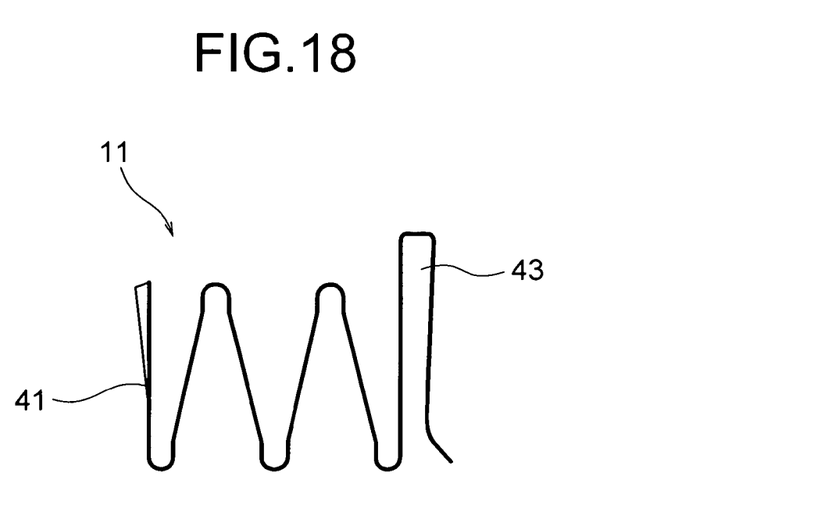
FIG. 18 is a plan view of an urging spring (accordion spring)

FIG. 16 is a developed view of the cage on the first flange side. FIG. 17 is a front view of the cage on the second flange side. FIG. 18 is a plan view of an urging spring which is an accordion spring.

Figure 19:
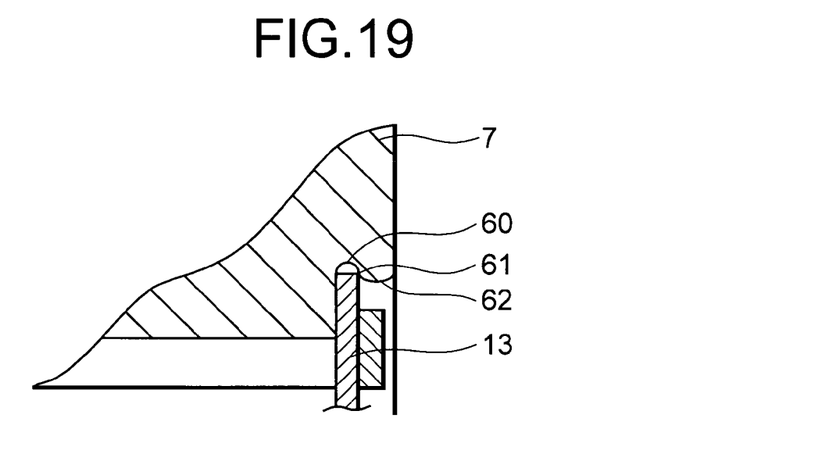
FIG. 19 is an enlarged cross-sectional view of a portion C in FIG. 13.
Figure 20:
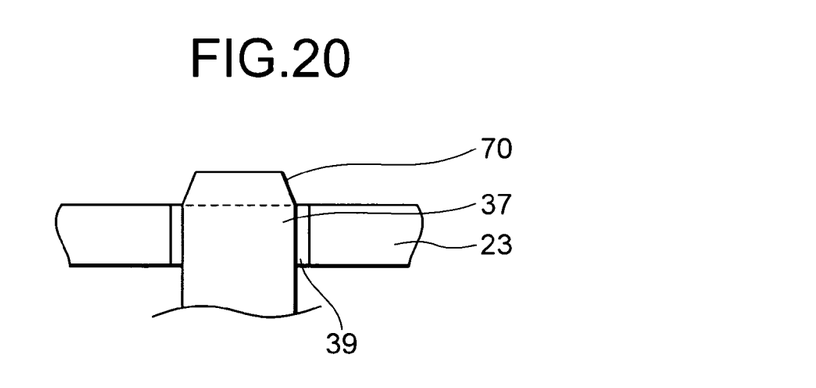
FIG. 20 is an enlarged view for showing a detention piece and a detention portion of a recess, seen from the inner diameter side outwardly in the radial direction.
Figure 21:
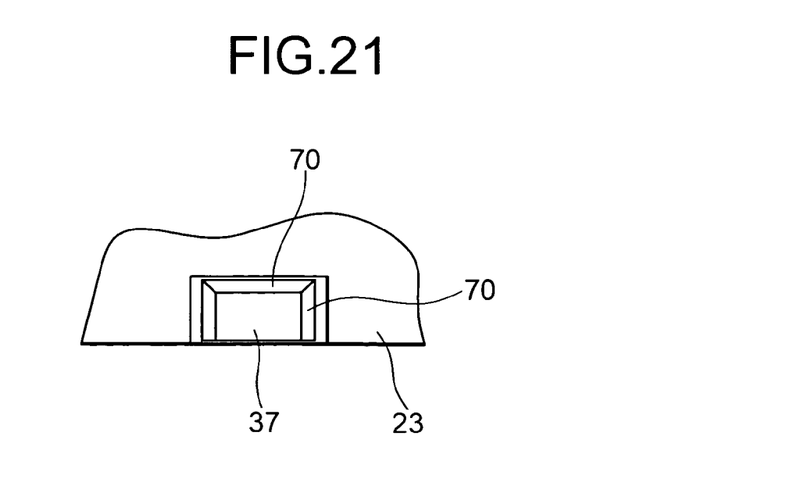
FIG. 21 is an enlarged view for showing the detention piece and the detention portion of the recess, seen from the front.

FIG. 19 is an enlarged cross-sectional view of the portion C in FIG. 13. FIG. 20 is an enlarged view for showing a detention piece and a detention portion of a recess, seen from the inner diameter side outwardly in the radial direction. FIG. 21 is an enlarged view for showing the detention piece and the detention portion of the recess, seen from the front.

The second embodiment is obtained by improving the first embodiment described above, and description of the arrangements and effects common to the both embodiments will be omitted. Only different points will be described.

In the first embodiment described above, it is feared that, during conveyance preceding to the assembling in the main body of a two-wheeled vehicle, an automatic transmission, or the like, the cage 13, constituent parts assembled in the cage 13, or the like, may drop out from the outer race member 7.

For such a reason, in the second embodiment, as shown in the portion C in FIG. 13 and in FIG. 19, a circumferential fit groove 60 which is substantially annular and narrow is provided on the inner peripheral end edge of the outer race member 7.

Additionally, as shown in FIG. 14 and FIG. 17, a plurality of engagement projections 61 are formed on the outer peripheral end edge of the second flange 23 of the cage 13, each to be fitted in fit groove 60 and engaged therewith.

As shown in FIG. 19, it is arranged such that, when the cage 13 is attached to the outer race member 7 for assembling, that is, when the second flange 23 is inserted in the axial direction, these plurality of engagement projections 61 are fitted in the fit groove 60 (circumferential groove) and are engaged therewith.

Note that, when this fitting is carried out, the second flange 23 is slightly flexed. Also, as shown in FIG. 19, a chamfered or beveled portion 62 serving as a guide part is formed on the inner peripheral end surface of the outer race member 7 in such a manner that, when the second flange 23 is inserted in the axial direction, the engagement projections 61 are smoothly moved on the inner peripheral end surface of the outer race member 7 to be guided into the circumferential fit groove 60.

As described above, since the plurality of engagement projections 61 are fitted in the circumferential groove 60, it is possible to restrict a movement of the cage 13 in the axial direction by detaining the cage 13 at that position in the axial direction. Also, since the second flange 23 and the engagement projections 61 are elastically deformed comparatively less, compared with structure disclosed in the Japanese Patent Application Laid-Open No. 11-117955, the cage 13 can be detained at that position in the axial direction without fail, and consequently, the cage 13, or the like, can be prevented from getting out of the outer race member 7.

Also, in the first embodiment described above, when the cage 13 is completed by assembling all the constituent parts of the case 13, there is a probability that the assembling performance of each part is not always satisfactory so that the detention piece 37 is, for example, when it is to be fitted in the recess 39, caught or hooked by the recess 39 without being fitted therein.

In order to prevent such a trouble, in the second embodiment, a chamfered or beveled portion 70 serving as a guide for guiding the detention piece 37 to be fitted into the recess 39 is provided in the tip end portion of the detention piece 37.

With such an arrangement, the tip end portion of the detention piece 37 can be fitted in the recess 39 easily and the detention piece 37 can be prevented from being hooked or caught by the recess 39, whereby the assembling performance of each part of the cage can be remarkably improved.

The guide part 70 described above is formed by chamfering or beveling the tip end portion of the detention piece 37. However, it is possible to provide any other contrivance, and the guide part may be in an inclined, arcuate, or any other form so long as the tip end portion is not hooked nor caught by the end surface of the recess 39. Also, it is possible to obtain the same effect by properly altering the surface roughness, or the like, of the guide part. Further, it is possible to prevent the tip end portion from being hooked or caught by the end surface of the recess 39 by properly setting a detention space between the detention piece 37 and the recess 39. Also, as shown in FIG. 15 and FIG. 20, each detention piece 37 is slightly protruded from the second flange 23. The amount of this projection is made smaller than that of the connection piece 33 (the caulking portion or the thick plate portion), as shown in FIG. 15. With such an arrangement, it is possible to securely attain a sufficient engagement or abutment between the detention piece 37 and the recess 39.

Note that the assembling performance may be improved by disposing this chamfered or beveled guide part 70 on the recess 39 of the second flange 23. In this case, however, the degree of engagement between the recess 39 and the detention piece 37 becomes lower unless the detention piece 37 takes a form in compliance with the guide part 70. Thus, the working process becomes complicated correspondingly. As a result, the method illustrated in the respective drawings above is superior in terms of the productivity.

The specific embodiments of the present invention are as described above. However, the present invention is not limited to these embodiments. For example, in the foregoing embodiments, the present invention is applied to the one-way clutch device of a roller type which has cam surfaces on the outer race member. However, the present invention can be applied to a one-way clutch device which has cam surfaces on the inner race member, or has steel balls as the torque transmission members, instead of the torque transmission rollers. In addition, a metal plate other than a steel plate such as a brass plate may be used for the first flange and the second flange. Further, the number of the torque transmission members, the specific forms of the first and second flanges, the entire structure of the one-way clutch device, etc., may be properly altered within the scope and spirit of the present invention.

According to the one-way clutch device of the present invention, the strength and the rigidity of the coupling columns of the case become very high, so that the coupling columns are not likely to be deformed due to the centrifugal force even when the one-way clutch device is used in an automatic two-wheeled vehicle. Additionally, the accordion spring is, since being securely retained by the coupling column and the second flange at the fixed end thereof, not likely to fall out due to centrifugal force. Thus, the one-way clutch device can maintain the stable function even if it is used for a long term.

It is also possible to prevent the cage, or the like, from falling out of the outer race, and moreover, the assembling performance of each constituent part of the cage can be improved.

What is claimed is:

1. A one-way clutch device comprising an inner race element, an outer race element disposed to be coaxial and relatively rotatable with the inner race element, a plurality of cam surfaces formed on either one of the outer peripheral surface of said inner race element and the inner peripheral surface of said outer race element, a cylindrical surface formed on the other of the outer peripheral surface of said inner race element and the inner peripheral surface of said outer race element, a plurality of torque transmission members interposed between said cam surfaces and said cylindrical surface, springs urging respective torque transmission members in a direction of torque transmission, and a cage retaining said torque transmission members and said springs, said cage including first and second plates each of a substantially annular form, the first plate having a plurality of coupling columns extending substantially perpendicularly therefrom and fixed to the second plate, said torque transmission members and said springs being retained between the coupling columns, wherein each of said coupling columns has a substantially Z-shaped cross section including an outer peripheral portion extending substantially along a tangential direction of said outer race element, an inner peripheral portion extending substantially along a tangential direction of said inner race element, and an inclined portion coupling said outer peripheral portion and said inner peripheral portion; and said springs each being disposed at an inner diameter side of said outer peripheral portion of a corresponding coupling column so that an end of the spring is held on said inclined portion of the corresponding coupling column, and another end of the spring urges the corresponding torque transmission member in a direction of torque transmission, wherein one end of each of said springs is held by and between said inclined portion and the second plate.

2. A one-way clutch device according to claim 1, wherein the torque transmission members are rollers.

3. A one-way clutch device according to claim 1, wherein said first and second plates are metal plates.

4. A one-way clutch device comprising:

an inner race element having a cylindrical outer peripheral surface;

an outer race element formed with a plurality of cam surfaces on an inner peripheral surface;

a plurality of torque transmission members interposed between said respective cam surfaces and said cylindrical surface;

springs urging respective torque transmission members in a direction of torque transmission; and a cage retaining said torque transmission members and said springs, said cage including first and second plates, each of a substantially annular form, the first plate having a plurality of coupling columns extending substantially perpendicularly therefrom and fixed to the second plate, said torque transmission members and said springs being retained between the coupling columns, wherein each of said coupling columns has a substantially Z-shaped cross section including an outer peripheral portion extending substantially along a tangential direction of said outer race element, an inner peripheral portion extending substantially along a tangential direction of said inner race element, and an inclined portion coupling said outer peripheral portion and said inner peripheral portion, a connection piece protruded from an end surface of said outer peripheral portion being fixed to the second plate, and a detention piece protruded from an end surface of said inner peripheral portion being fitted into a recess formed on the second plate.

5. A one-way clutch device according to claim 4, wherein an amount of projection of said detention piece is smaller than that of said connection piece.

6. A one-way clutch device according to claim 4, wherein the torque transmission members are rollers.

7. A one-way clutch device according to claim 4, wherein said first and second plates are metal plates.

* * * * *